July 29, 1969

H. GANG 3,458,125

PROGRAMMING MEANS FOR CALCULATORS

Filed Sept. 20, 1966

INVENTOR
HERMAN GANG

July 29, 1969  H. GANG  3,458,125
PROGRAMMING MEANS FOR CALCULATORS
Filed Sept. 20, 1966  11 Sheets-Sheet 2

FIG.2

INVENTOR
HERMAN GANG

July 29, 1969     H. GANG     3,458,125
PROGRAMMING MEANS FOR CALCULATORS Filed Sept. 20, 1966     11 Sheets-Sheet 4

FIG. 4

INVENTOR
HERMAN GANG

July 29, 1969     H. GANG     3,458,125

PROGRAMMING MEANS FOR CALCULATORS

Filed Sept. 20, 1966     11 Sheets-Sheet 6

INVENTOR
HERMAN GANG

July 29, 1969

H. GANG 3,458,125

PROGRAMMING MEANS FOR CALCULATORS

Filed Sept. 20, 1966

INVENTOR
HERMAN GANG

United States Patent Office 3,458,125
Patented July 29, 1969

3,458,125
PROGRAMMING MEANS FOR CALCULATORS
Herman Gang, Morris Plains, N.J., assignor to Litton
  Business Systems, Inc., a corporation of New York
Filed Sept. 20, 1966, Ser. No. 580,729
Int. Cl. G06c 23/00, 29/00; G06k
U.S. Cl. 235—62                    19 Claims

ABSTRACT OF THE DISCLOSURE

A programming means for a calculator including a memory device, which is sequentially set by the depression of a sequence of function keys. Repeated depression of another key causes the machine to repeat the memorized functions in the same sequence as entered.

---

This invention relates to memory devices and more particularly to a device for calculating machines settable in response to the initiation of each of a sequence of different machine operations and thereafter repeatedly operable to initiate said sequence of operations.

Many types of calculations comprise a sequence of different machine operations each initiated upon depression of a related function key subsequent to entry of a value into the machine, or initiated without entry of a value when a value accumulated by one machine operation of the sequence is used in the following operation.

Usually a great number of like calculations of the above type is required in the performance of certain work. The operator then must alternately enter values into the machine and depress different function keys in correct sequence. It will be obvious that such operation will lend to early fatigue with resulting errors usually with respect to correct function key depression.

It is therefore the primary object of the invention to provide a calculating machine with a memory device which will enable operation of the machine with a minimum of errors in the performance of a series of like calculations requiring a plurality of different functions.

A more particular object is to provide such a memory device which will permit the operator to perform a series of like calculations of the aforesaid type in a simplified manner after performing the first calculation of the series in the usual manner.

Another and more specific object is to provide a memory device which will permit the operator to perform a series of like calculations of the aforesaid type simply by entering the digits required for each function and then depressing the same (master) key for each function in lieu of a function key.

Another and important object is to eliminate the necessity of depressing the aforenoted master key for any machine function which does not require prior entry of a value into the machine.

Other objects and advantages of the invention will be implicit in the following description of a preferred embodiment of the invention with reference to the accompanying drawings in which.

The invention is disclosed as embodied in the ten-key type calculating machine disclosed in applicant's patent No. 3,194,495, and copending applications Ser. Nos. 338,242 filed Jan. 16, 1964, now Patent No. 3,367,568 and 539,222 filed Mar. 31, 1966, now Patent No. 3,372,868. Reference is made to this patent and applications for a complete disclosure of mechanism herein referred to but not disclosed or described in detail.

It will be understood that the devices of the invention are concerned with the initiation of a plurality of machine operations in a predetermined sequence and that the invention is in no manner concerned with the performance of the operations.

Specifically the invention concerns control of depression of a plurality of machine function keys in a given sequence. The invention is not concerned with the operation of the means operable in conjunction with the function keys to initiate the machine operations, and it will be obvious that the devices of the invention could act directly on the initiating means to the exclusion of the keys.

Figure 1:
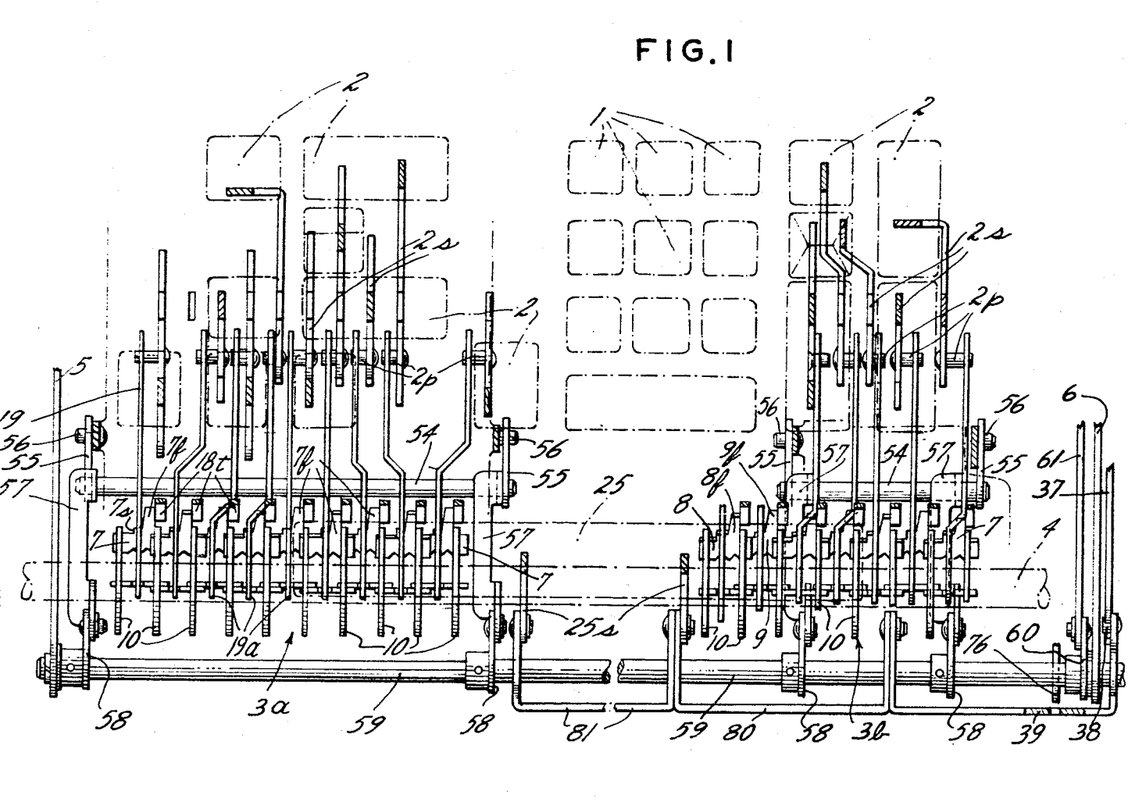
FIG. 1 is a schematic development showing the relationship of parts of the devices of the invention with respect to the function keys shown in phantom.

Referring to FIG. 1, the ten key type machine has, at its front, a keyboard including a grouping of digit keys 1 of the values 0 to 9 shown in dot-dash lines for controlling entry of selected values into the machine. A grouping of nine function keys 2 and another grouping of five function keys 2, shown in dot-dash lines, are located to the left and right respectively of digit keys 1.

Function keys 2 have not been identified according to their particular function as such identification is unnecessary for an understanding of the operation of the invention. It is sufficient to understand that digit keys 1 are depressed to enter a value into the machine and that such entry is followed by depression of a particular one of function keys 2 to initiate a machine operation employing the entered value. A particular calculation may require several digit entry operations each followed by depression of a different or of the same function key 2. In some calculations, a function key will be depressed without prior entry of a digital value. In this instance, a value in the machine from a prior machine operation is utilized in the ensuing operation.

THE MEMORY OR PROGRAM UNIT

The memory or program unit (FIG. 1) comprises a storage drum 3a associated with the left grouping of function keys 2 and a storage drum 3b associated with the right grouping of function keys 2. The two drums are fixed on a spline shaft 4 (FIGS. 4, 5, 10–13) which extends transversely of the machine between side frames 5 and 6 forwardly of and below the keyboard. Shaft 4 is rotated and shifted longitudinally as later described. Accordingly, drums 3a and 3b, fixed on the shaft, are operated as a unit.

Drum 3a includes a ring of function memory or storage slides 7 for each function key 2 of the left grouping. Therefore, drum 3a includes nine rings of slides 7. Drum 3b includes a ring of slides 7 for each function key 2 of the right grouping. Therefore drum 3b includes five rings of slides 7.

Additionally, drum 3b includes a leftmost ring of program terminating slides 8 and immediately to the right thereof, a ring of repeat cycle control slides 9. The operation of these slides in conjunction with slides 7 will be described later.

The rings of slides 7, 8 and 9 are substantially identical; and therefore it will be sufficient to describe one of the rings with reference to a ring of slides 7.

Slides 7 of a ring are supported in circumferentially spaced relationship between a pair of discs 10 which are longitudinally spaced and fixed on spline shaft 4. There are thirteen slides and drums 3a–3b are indexed counterclockwise as later described from the clockwise home position of FIG. 4 to bring the slides successively into a controlling position. Slides 7 therefore are equidistantly spaced except the first and last slides where the spacing is greater. This, however, has no significance, because the devices are designed to store programs having thirteen or fewer operations. Obviously there may be a greater or a fewer number of slides in accordance with the program needs.

The left and right ends of each slide 7 extend through slots 11 (FIGS. 4, 13) in the respective opposed discs 10. The slides are therefore supported in circumferentially spaced relationship and for longitudinal sliding movement with respect to shaft 4 and drums 3a–3b. Slots 11 are of such width that they also support the opposite ends of a next adjacent ring of slides 7. A disc therefore acts as a common support for adjacent rings of slides.

Each slide 7 may be adjusted to a rightmost disabled position or to a leftmost enabled position as later described. When the slide is in rightmost position, a finger 7f extending radially outwardly therefrom engages right disc 10 to act as a stop. When the slide is in leftmost position, a shoulder 7s to the left of finger 7f engages left disc 10 to act as a stop.

Detent means for each slide 7 to hold it in its right or left adjusted position comprises a flexible tooth 12 (FIGS. 5, 6a–6d) which engages one or the other of a pair of notches 7n in the inner edge of the slide. Teeth 12 are integral with a common collar 13 which is fixed on shaft 4 between the pair of disc 10.

It has been noted that slides 8 and 9 (FIGS. 1, 5, 10, 12) are constructed substantially in accordance with slides 7. Each slide 8 therefore includes a finger 8f, a shoulder 8s, and notches 8n. Likewise each slide 9 includes a finger 9f, a shoulder 9s and notches 9n.

The left-end of shaft 4 (FIG. 10) is rotatably and slidably mounted in a bearing 14 which is fixed in left side frame 5. A ratchet wheel 15 (FIGS. 2, 3, 10, 11) located to the outside of right side frame 6 has a hub 15h which is rotatably mounted in said side frame. Hub 15h is splined on the right end of shaft 4. Ratchet wheel 15 therefore is adapted to drive shaft 4 which is longitudinally adjustable in hub 15h.

Shaft 4 is biased clockwise (FIGS. 2, 3, 11) toward the aforenoted normal position and also to a normal left end position. Means for biasing shaft 4 comprises an elongated torsion spring 17 (FIG. 10) which is located within a bore 4b in shaft 4. Spring 17, at its left end, is attached to side plate 5 by a pin extending through an eye at the left end of the spring and through a collar fixed to the plate, and to shaft 4 by a pin extending through an eye at the right end of the spring and through the shaft. Before assembling, shaft 4 is rotated counterclockwise to wind spring 17 so that the shaft will be biased clockwise toward home position also the spring is tensioned to bias shaft 4 longitudinally to left end position.

It will be noted that there are fourteen rings of slides 7, the ring of slides 8, and the ring of slides 9. Each ring is in the same angular relationship on shaft 4. Therefore, there are thirteen longitudinal rows of sixteen slides each including fourteen slides 7, one slide 8, and one slide 9.

When drums 3a–3b are in clockwise home position, the first row of slides 7, 8, 9 is in operating relationship with respect to teeth 18t of a comb 18 (FIGS. 1, 4, 5, 6a–6d) which is secured to the keyboard frame and extends longitudinally above the drums. Furthermore, slides 7 of the row are in operating relationship with respect to the forward ends 19a of feeler levers 19. As drums 3a–3b are are indexed counterclockwise, later described, the rows of function control slides 7 will be moved successively into operating relationship with teeth 18t and feeler ends 19a. Program terminating slides 8 and cycle control slides 9, however, are not operatively associated with feeler levers 19, but with teeth 18t and respectively with boils 20 and 21 (FIGS. 2, 3, 10–12).

For the present, it will be sufficient to note the following relationship of the parts when drums 3a–3b are in normal left longitudinal position, and in clockwise home position with the first row of slides 7, 8, 9 in the aforenoted operating relationship with respect to teeth 18t, feeler ends 19a and bails 20, 21.

Figure 6A:
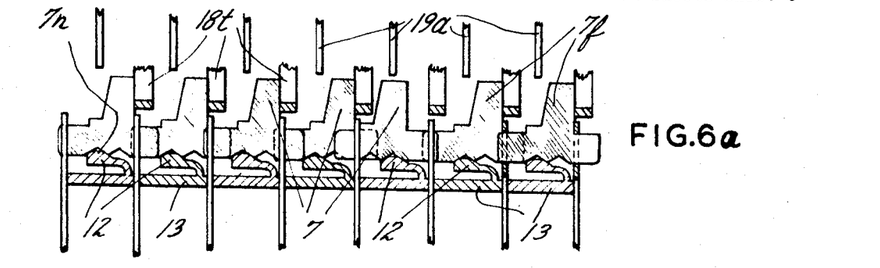
FIGS. 6a–6d are mechanical schematic views of a row of storage slides and associated parts in their several adjusted positions.

With reference to FIG. 6a, all but one function control slide 7 will be in right adjusted disabled position with a tooth 18t immediately to the right of finger 7f of each disabled slide. A feeler end 19a will be immediately to the left and slightly above the end of finger 7f of each disabled slide 7. One slide 7 will be in left adjusted enabled position with the end of its finger 7f immediately beneath the end 19a of the associated feeler lever 19.

Program terminating slide 8 of the row will be in right adjusted disabled position with a tooth 18t immediately to the right of finger 8f and with bail 20 lowered with a depending cam lobe 20c at the left end of the bail immediately to the left (FIG. 5) and forwardly (FIG. 11) of finger 8f of the slide.

Cycle control slide 9 of the row will be in right adjusted disabled position with a tooth 18t immediately to the right of finger 9f and with bail 21 lowered with a depending cam lobe 21c at the left end of the bail immediately to the left of finger 9f of the slide.

The adjustments and operation of the above-described parts will be described later with reference to a setting and operating clutch 22 described in the following.

SETTING AND OPERATING CLUTCH

Clutch 22 (FIGS. 2, 7a–7e) located on the right side frame adjacent the rear of the machine, is of the well-known type wherein a spring urged pawl 22p on the driven member 22a of the clutch is adapted to engage the driving member 22b to engage the clutch. A clutch lever 23 is normally spring held clockwise to engage clutch pawl 22p and thereby hold the clutch in full cycle disengaged position. Counterclockwise movement of lever 23 will release pawl 22p to engage the clutch.

The machine is driven by an electric motor (not shown) and the driving member 22b of clutch 22 is driven by a suitable drive train 16d from the output shaft 16 driven by the motor. The motor may be continuously operated or may be controlled by switch means which is closed upon depression of any one of the digit keys 1, function keys 2 or a master key 25 (FIGS. 1, 8) in well-known manner.

A single cycle clutch lever 26 is operable to insure that clutch 22 will cycle only once for each depression of a function key 2 in a setting or "learn" operation later described. Furthermore, clutch lever 26 is controlled for automatic engagement of clutch 22 in a program of operations later described. Clutch lever 26 has common pivotal mounting with clutch lever 23 and normally is counterclockwise with its operating end slightly above clutch pawl 22p when clutch 22 is disengaged by clutch lever 23.

The lower end of lever 26 is pivotally connected to the rear of a forwardly extending link 27 which has a slot 27s at its front engaging a pin 28p at the rear of another forwardly extending link 28. A spring between pin 28p and an eye on link 27 normally holds link 27 forwardly with respect to link 28 with the rear of slot 27s engaging pin 28p. Link 27 therefore is coupled to link 28 for yieldable forward movement and positive return movement.

Link 28 is slidably supported at its rear by a fixed pin engaging a slot in the link, and at its front the link is pivotally attached to one arm of a bail 29 which is spring held counterclockwise. Each of the stems 2s of function keys 2 has a shoulder overlying common bail 29. Therefore, upon depression of a function key, bail 29 will be rocked clockwise and links 28, 27 will be moved forwardly to rock lever 26 into the path of pawl 22p of clutch 22 which will be engaged as later described. As a result, clutch 22 will be disengaged by lever 26 when it completes a single cycle.

Depression of a function key 2 will engage a main clutch (not shown) and the depressed key will be held depressed until completion of the initiated operation after which it will be restored. Accordingly, bail 29 and links 27, 28 will be restored thereby restoring lever 26 counterclockwise to release clutch pawl 26. However, at this time, clutch lever 23 will be in the path of pawl 22p and therefore clutch 22 will be held disengaged after a slight step of movement.

THE PROGRAMMING OR SETTING OPERATIONS

The machine is programmed by performing in the usual manner a calculation requiring a sequence of machine functions or operations which may include addition, subtraction, multiplication, division, squaring, transferring, etc. The first function of the sequence will always require entry of a value through digit keys 1 (FIG. 1). Other functions of the sequence may not require value entry when the values in the machine from the preceding function are utilized exclusively in the operation. After the machine is programmed, any number of like calculations may be performed simply by entering the required values through digit keys 1 and depressing master key 25 after each entry. When a function is performed without value entry, this function is initiated automatically following the preceding function without depression of the master key. From the above, it will be seen that when the machine stops upon completing a function, the operator will know that the next digit entry and master key depression is required.

Figure 2:
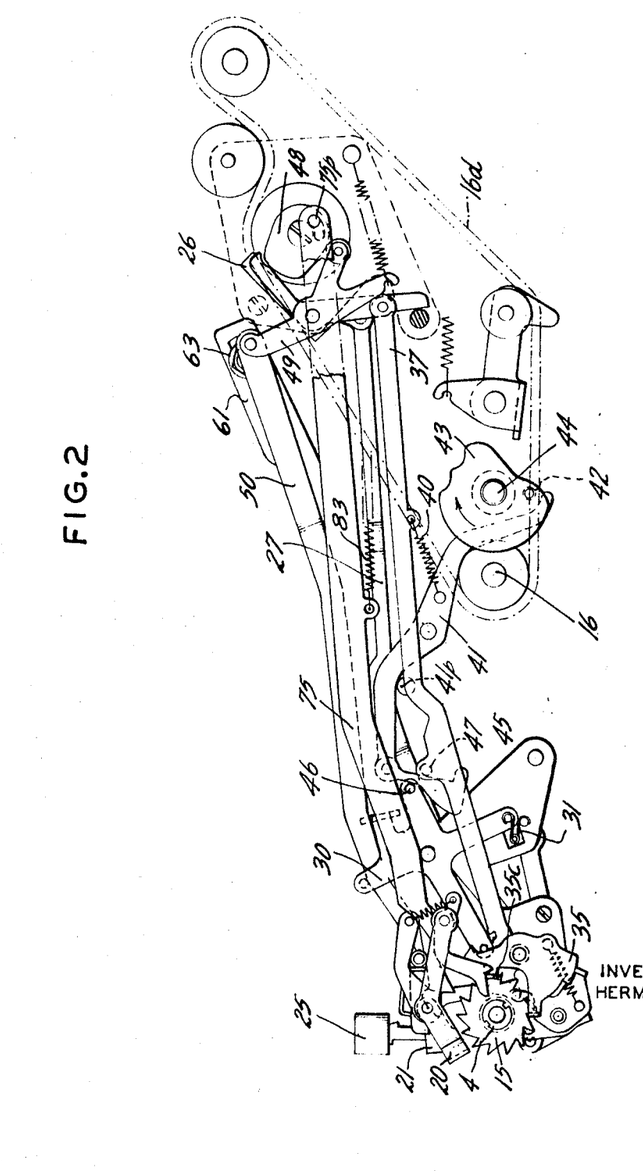
FIG. 2 is a right side view of the drive means for controlling the program memory and repeat means.

A control lever 30 is adjusted to a clockwise "learn" position of FIG. 3 when the machine is to be programmed and subsequently counterclockwise to an automatic position of FIGS. 2, 7c when the programmed devices are to be used to control the machine. A toggle spring 31 attached to a pin at the lower end of lever 30 and to the machine framing holds the lever in its adjusted positions while the pin engaging a slot in the framing acts as a limit stop. With lever 30 in clockwise "learn" position a programming operation will be described in the following.

The following described program will comprise four machine operations. The first, second and fourth operations will require digit entry through keys 1, whereas the third operation will be initiated without such digit entry. It will be understood that the program is merely illustrative of the utility of the invention, and that the operation of the machine in performing the particular operations of the program is in no manner interrelated with the operations of the devices of the invention. Also, it will be understood that a program may comprise any number of operations within the capacity of the storage devices.

Drums 3a–3b will be in the previously described clockwise home position (FIG. 4) to which it is biased by spring 17 (FIG. 10) and wherein the first row of slides 7, 8 and 9 are in setting positions. Drums 3a, 3b are located in home position by a stop pawl 32 (FIG. 3) having a shoulder 32s which is engaged by a pin 33 on ratchet wheel 15 which rotates with shaft 4 and drums 3a–3b. Stop pawl 32 is held counterclockwise with shoulder 32s engaging pin 33 by a spring 34 between said pawl and a back stop scapement pawl 35, later described, which is held clockwise by the spring.

After entry of the first value through digit keys 1, the required function key 2 of the program will be depressed. Depression of key 2 will rock bail 29 (FIG. 7b) to engage the main clutch for a cycle of operation whereby initiating the first operation of the program. Means is operable by the main clutch during the cycle to effect engagement of setting clutch 22 (FIGS. 2, 7c) as follows.

A forwardly extending link 37 is pivotally attached at its rear to the lower end of clutch lever 23. The front end of link 37 is provided with an open end slot which is engaged by a pin 38 at the end of an upstanding arm of a bail 39. Normally, link 37 is held forwardly by a spring 40 with clutch lever 23 in clockwise clutch disengaging position (FIG. 7c).

A lever 41 (FIG. 2) is spring urged counterclockwise normally to engage a limit stop 41p. The rearward edge of a downwardly turned rear arm of lever 41 is adapted to be engaged by a pin 42 on a locator cam 43 which is fast on the right end of drive shaft 44 of the main clutch. A forwardly extending arm of lever 41 carries a pivotally mounted cam pendant 45 having a lower cam portion and an upper neck portion which is trapped between a pin 46 at the end of a rearwardly extending arm of control lever 30 and a pin 47 on link 37 when lever 30 is in the clockwise "learn" position of FIG. 3.

Upon operation of the main clutch, shaft 44 and cam 43 will be rotated clockwise. Accordingly, pin 42 will rock lever 41 clockwise and then release the lever which will be restored against the limit stop. When lever 41 is rocked, the cam end of pendant 45 will engage pin 46 of lever 30 thereby swinging said pendant rearwardly, and by engagement with pin 47, moving link 37 rearwardly to rock lever 23 to engage setting clutch 22 for a single cycle. A single cycle will be insured by clutch lever 26 (FIG. 7b) which will engage clutch pawl 22p until the latched down function key is released at the termination of the current function of the program. The various operations and the mechanism controlled by setting clutch 22 to perform the operations during the cycle will be described in the order in which they occur.

Figure 5:
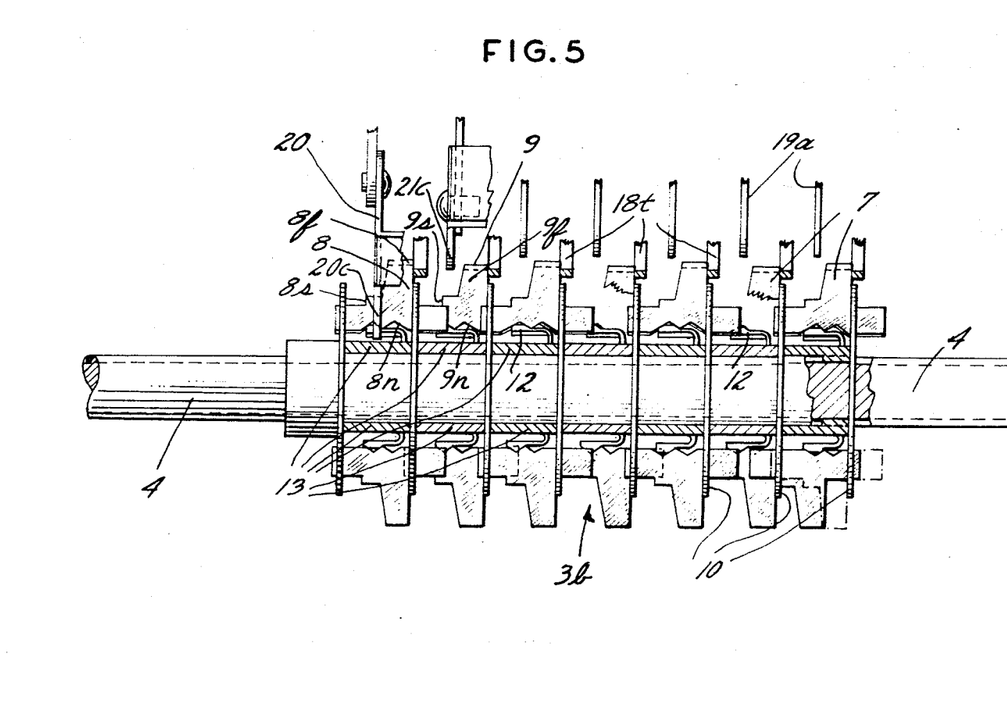
FIG. 5 is a front view of the storage drum with parts broken away and removed for clarity.
Figure 6B:
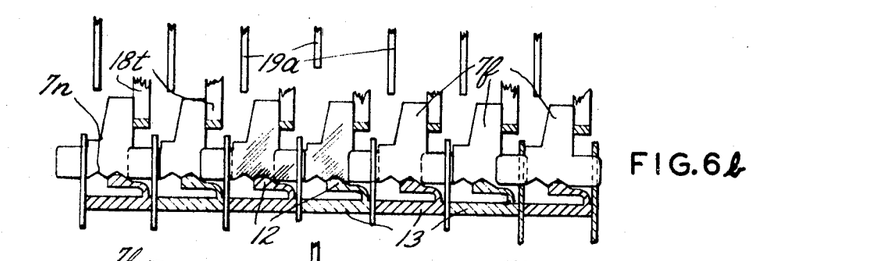

First drums 3a–3b will be moved a step to the right from their normal left position of FIGS. 1, 5, 6a to the position of FIG. 6b. It will be recalled that there is a tooth 18t of comb 18 immediately to the right of fingers 7f, 8f, 9f of each slide 7, 8, 9 of the row which is in setting position when said slides are in right adjusted disabled position with respect to drums 3a–3b and when the drums are in normal left position. All slides 7 but one will be in disabled position as shown in FIG. 6a. This one slide 7 however, will be in left adjusted enabled position from a prior setting operation and where its finger 7f will be spaced to the left from the associated tooth 18t and beneath and 19a of the associated lever 19. Program terminating slide 8 will be in disabled position as any program would include more than one machine operation or function. Cycle control slide 9 would always be in disabled position, as will appear, because there will always be a value entered through digit keys 1 for the first machine function of a program.

With the above in mind, it will be seen that when drums 3a–3b are stepped to the right, all disabled slides 7, 8, 9 of the row will be restrained from like movement by engagement of their fingers 7f, 8f, 9f with teeth 18t. Therefore, when drums 3a–3b have been given the step of movement to the right, all slides 7, 8, 9 will be in left enabled position with respect to drums 3a–3b as shown in FIG. 6b.

The means for stepping drums 3a–3b to the right includes a cam 48 (FIG. 7d) which is rotated counterclockwise by clutch 22. A cam follower 49 engages cam 48 and a forwardly extending link 50 is pivotally attached at its rear to the follower. The front of link 50 (FIG. 4) has a recess 50r in its under edge which engages a crank arm 51a of a crank 51 which has suitable bracket mounting adjacent the arm. Crank 51 extends forwardly from arm 51a in a forked front end which is located between a pair of spaced discs 52 fixed on spline shaft 4 adjacent its right end.

Figures 7A, 7B:
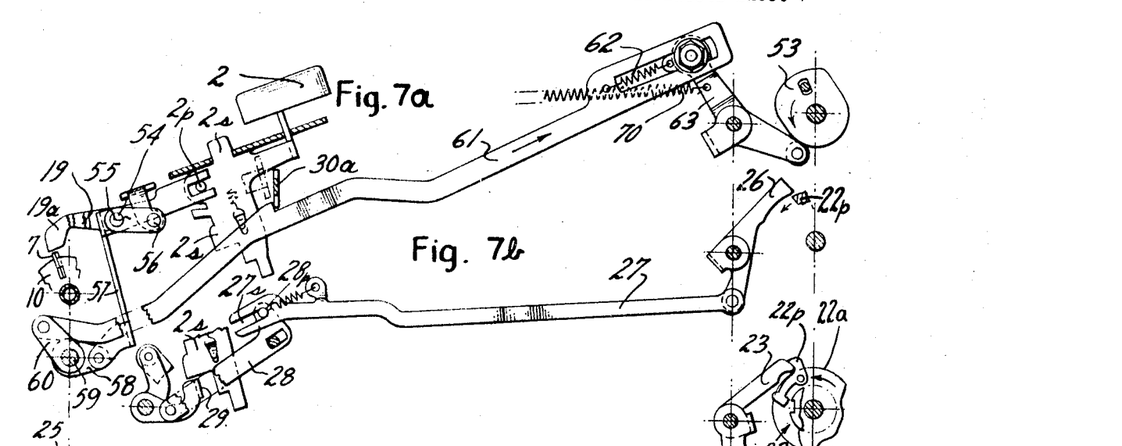
FIGS. 7a–7e are mechanical schematic side views of the setting and operating clutch, control means therefor, and devices which are set and operated by the clutch.
Figures 7C, 7D:
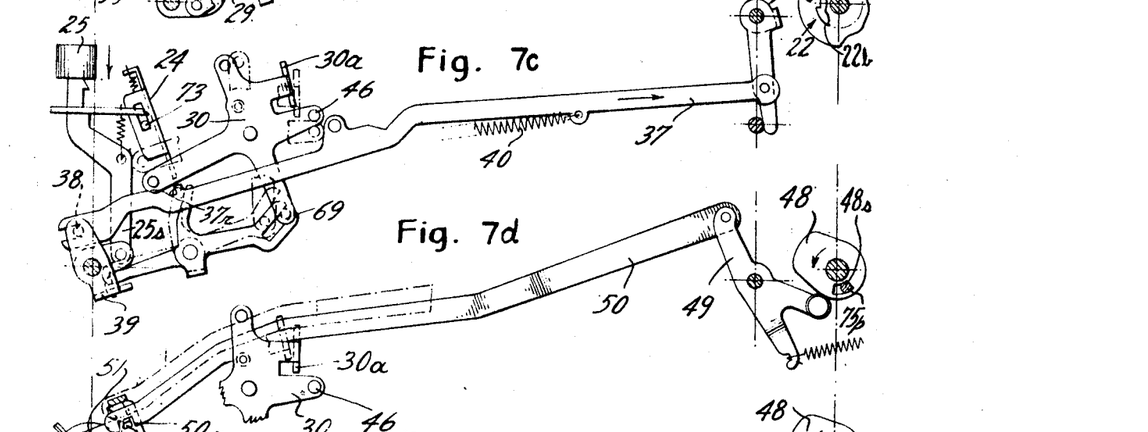
Figure 7E:
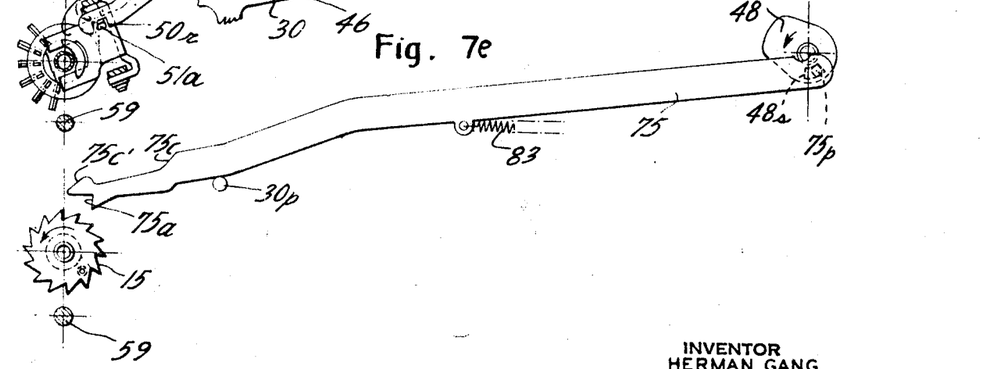

During the first part of the cycle of clutch 22, cam 48 will rock follower 49 clockwise from the normal position of FIG. 7d thereby drawing link 50 rearwardly and rocking crank 51 counterclockwise as viewed from above. Accordingly, the fork end of crank 51 between discs 52, will move shaft 4 and drums 3a–3b a step to the right resulting in adjustment of all slides 7, 8, 9 to enabled position with respect to drums 3a–3b as shown in FIG. 6b. In this operation, it will be seen that only said one slide 7 which is already in left enabled position (FIG. 6a) will move with drums 3a–3b to bring said slide immediately adjacent the related tooth 18t and to the right of the end 19a of the related feeler lever 19 (FIG. 6b). Furthermore, it will be seen that all ends 19a of levers 19 are immediately to the left of and above related slides 7. That is, their position is unchanged with respect of all slides 7 previously in disabled position. Also bail 20 (FIGS. 3, 11) will be in lowered position with depending cam lobe 20c immediately to the left (FIG. 5) but forwardly of finger 8f of enabled program terminating slide 8; and bail 21 (FIG. 12) will be lowered with depending cam lobe 21c immediately to the left (FIG. 5) and in alignment with finger 9f of cycle control slide 9.

Figure 6C:
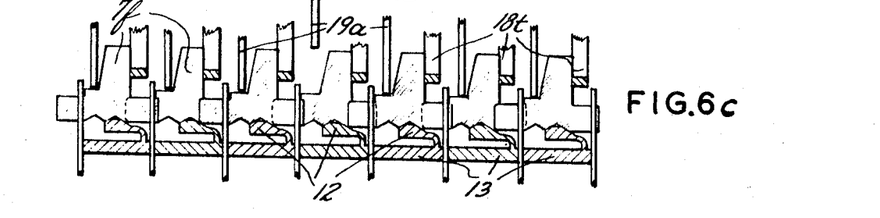

Following adjustment of the parts as described above, feeler levers 19 will be controlled by a cam 53 (FIG. 7a) on the same shaft with cam 48 and driven by clutch 22. However, when the function key 2 was depressed prior to this operation, the associated lever 19 was rocked clockwise (FIGS. 4, 8) to raise its end 19a from normal position to the position of the raised end 19a of FIG. 6b. The operation of cam 53 effects downward movement of all lever ends 19a including the raised end. This will locate ends 19a except the previously raised end immediately to the left of fingers 7f of slides 7 to thereby act as interponents as shown in FIG. 6c. However, end 19a which was raised upon depression of the function key 2, will not be lowered sufficiently to bring it below the level of the end 7f of the related slide 7. Levers 19 are constructed and are operated as follows.

Levers 19 (FIGS. 1, 4, 8) associated with drums 3a are fulcrumed intermediate their ends on a common transverse shaft 54, and extend forwardly and rearwardly from the shaft. Levers 19 associated with drum 3b are mounted in the same manner on a like shaft 54. The rear end of each lever 19 has an open end slot 19s which is engaged by a pin 2p in the stem 2s of a related function key 2 and is guided adjacent its front end 19a by a slot in comb 18.

Shafts 54 are supported at each end in the front end of a rearwardly extending link 55 which has fixed pivotal mounting 56 in the machine framing. A depending link 57 is pivotally connected at its upper end to each end of shafts 54 adjacent link 55, and is pivotally connected at its lower end to the end of a rearwardly extending crank arm 58 which is fast on a transverse shaft 59 rotatably mounted in the machine side frames. An upstanding crank 60 is fixed adjacent the right end of shaft 59, and a rearwardly extending link 61 is pivotally connected at its front to crank 60. Link 61 has yieldable connection 62 (FIG. 7a) to the upper end of a cam follower 63 which engages cam 53.

When the function key 2 is depressed to initiate the function and setting operations by clutch 22, pin 2p on the key stem rocks the connected feeler lever 19 clockwise around shaft 54 to raise front end 19a to the position of FIG. 6b.

Figure 4:
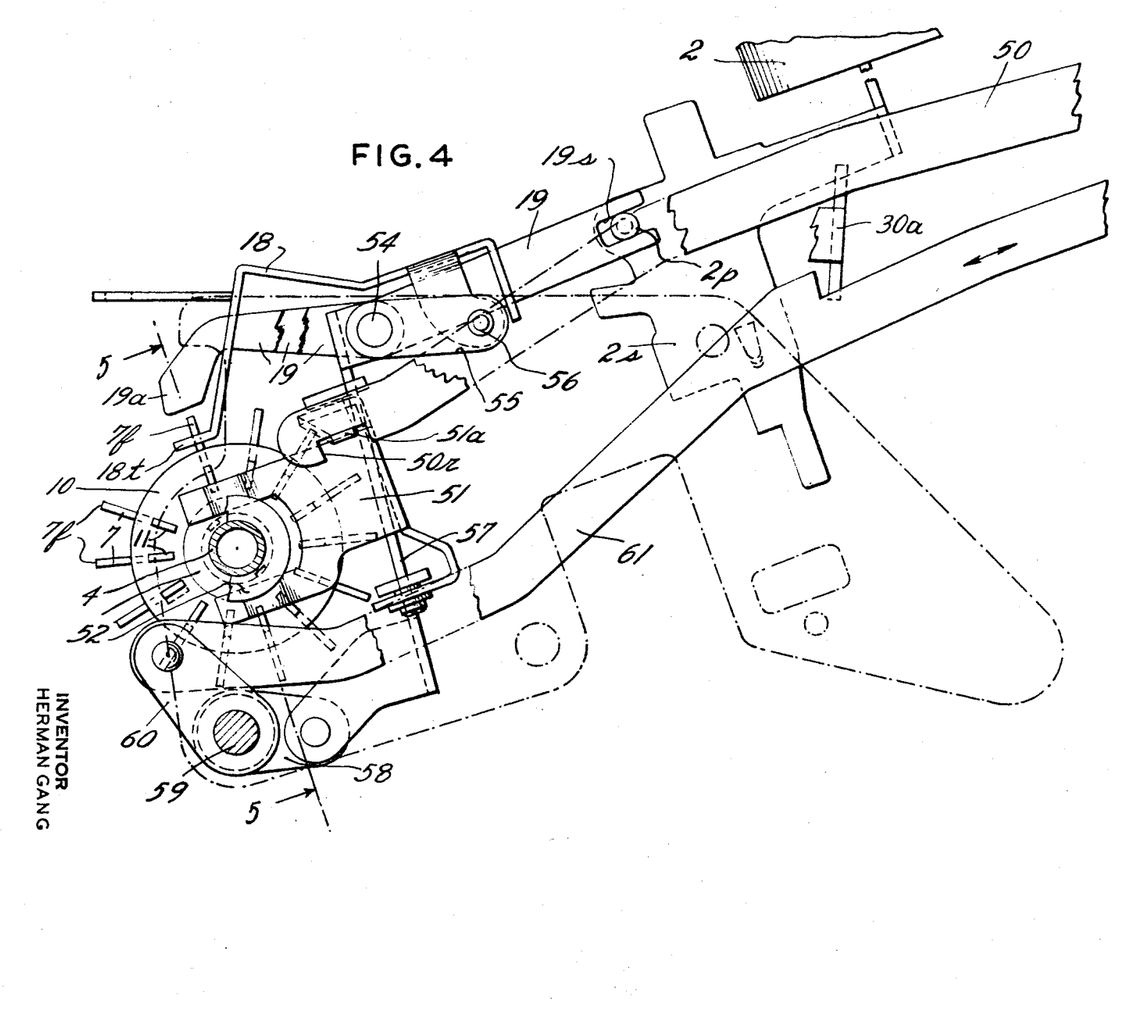
FIG. 4 is a right side view showing details of the storage and control means.
Figure 8:
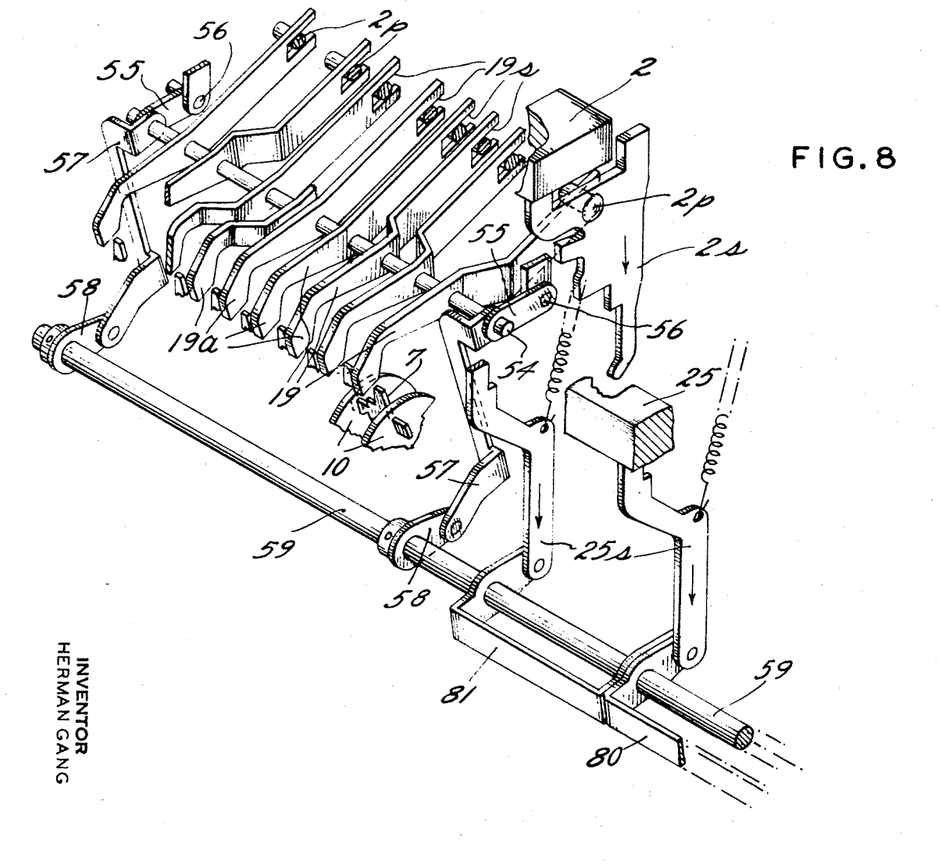
FIG. 8 is a perspective view of the control linkage between the function keys and the storage drum.
Figure 9:
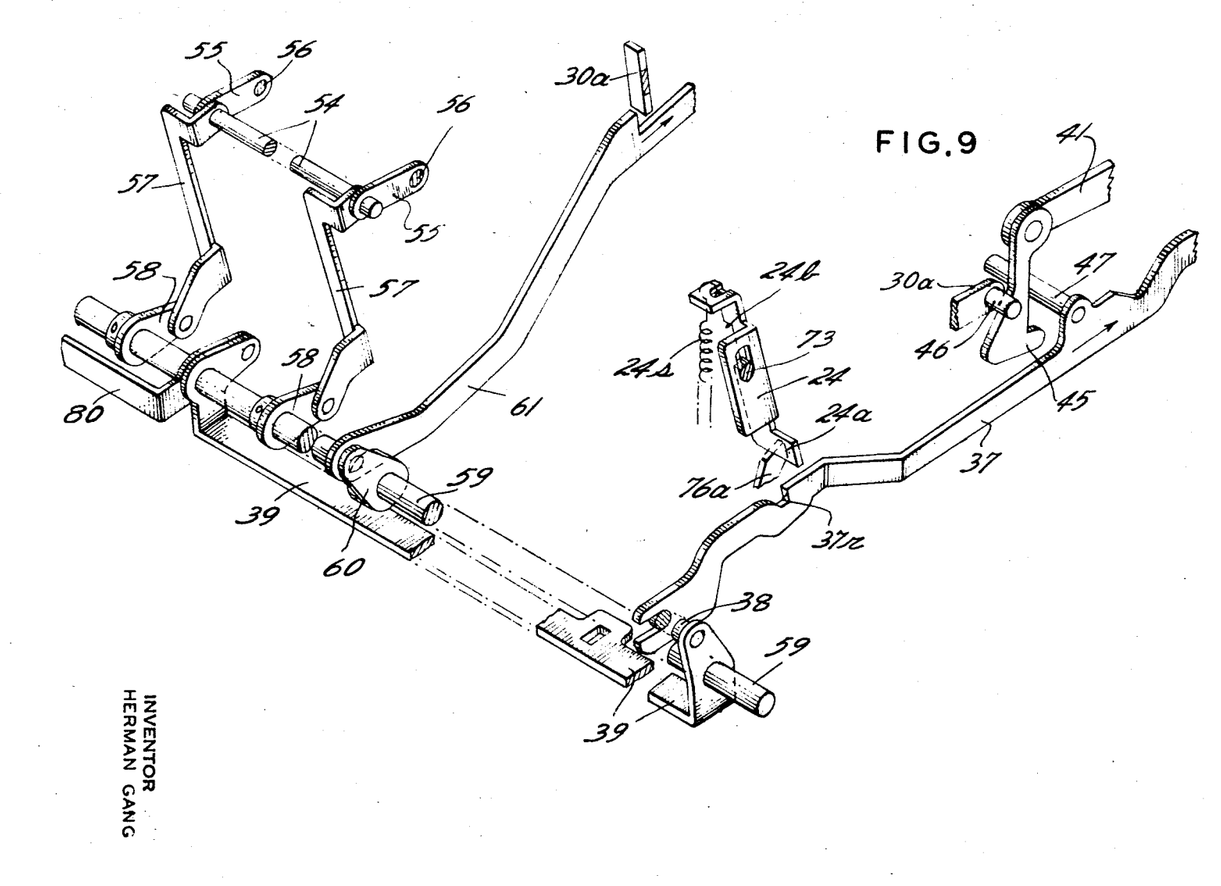
FIG. 9 is a perspective view of operating and control linkage.

After the previously described operation by clutch 22 through cam 48, cam 53 will rock follower 63 clockwise thereby drawing link 61 rearwardly to rock crank 60, shaft 59 and cranks 58 clockwise from the position of FIGS. 7a, 4, 8. This will move links 57 downwardly thereby rocking connected links 55 counterclockwise around their fixed pivots 56 and lowering shafts 54. When shafts 54 are lowered, all feeler levers 19 will be rocked counterclockwise about their rear end mountings on pins 2p of function keys 2 thereby lowering their front ends 19a to the positions shown in FIG. 6c.

It will be recalled that end 19a of lever 19 related to the depressed key 2 was raised to the position of FIG. 6b. Therefore, in the above described lowering operation of edns 19a, this one raised end will be lowered substantially to its normal location in a plane slightly above the ends of fingers 7f of slides 7 (FIG. 6c). All of the other ends 19a, however, will each be lowered from its normal location to a position immediately to the left of finger 7f of the related slide 7 as shown in FIG. 6c.

Figure 6D:
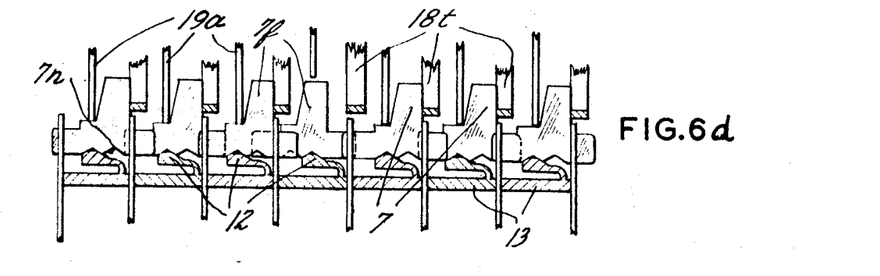

Following the above lowering operation for ends 19a of feeler levers 19, cam 48 will permit follower 49 to be restored counterclockwise and the connected drive train will restore drums 3a, 3b to normal left position. In this return leftward movement, lowered ends 19a to the left of fingers 7f will block such movement of related slides 7; and therefore these slides will be restored to disabled right adjusted position with respect to drums 3a–3b as shown in FIG. 6d. The end 19a, however, which is not lowered to the left of finger 7f of the related slide 7 will permit this one slide to be moved with drums 3a–3b in the left return movement. This slide therefore will remain in enabled position and the end of its finger 7f will be located immediately beneath the end 19a of the related feeler lever as shown in FIG. 6d.

In the return left movement of drums 3a–3b, slide 8 (FIGS. 5, 11) is adjusted with respect to depending cam lobe 20c of program terminating bail 20. Bail 20 extends longitudinally of drum 3b and is located slightly above and forwardly of said drum. Bail 20 is held in, previously noted, counterclockwise lowered position (FIGS. 3, 5), by a spring 65 between a release lever 64 pivotally mounted at the end of a rearwardly extending right arm of said bail and a rearwardly extending arm of a rebound crank 66 (later described).

As previously noted, came lobe 20c is immediately to the left but forwardly of finger 8f of slide 8 when said slide is in right disabled position with respect to drum 3b and when said drum is in normal left position. This relationship between finger 8f and cam lobe 20c will not change when drums 3a–3b are right shifted because a tooth 18t of comb 18 prevents movement with the drums as previously described. Accordingly, when drums 3a–3b are restored to the left, enabled slide 8 will be shifted therewith to locate finger 8f to the rear and in position to engage cam lobe 20c when drums 3a–3b are stepped counterclockwise as later described.

In the return left movement of drums 3a–3b, slide 9 (FIGS. 5, 12) is restored to right disabled position by cam lobe 21c of repeat cycle control bail 21. Bail 21 extends longitudinally of drum 3b and is located a short distance to the rear of bail 20. Bail 21 is held in, previously noted, counterclockwise lowered position (FIG. 12) by a spring 67 between a rearwardly extending right arm of said bail and the front arm of a latch lever 68.

Latch lever 68 has a forwardly extending hook end 68a which is adapted to engage a lug 21a on the right arm of bail 21 to hold the bail in clockwise raised position. Lever 68 is controlled by a pin 71p on the lower arm of a lever 71 which is fast on a shaft 72. Shaft 72 is rocked clockwise upon depression of any one of digit keys 1

(FIG. 1) as fully disclosed in applicant's Patent No. 3,044,697.

Lever 71 will be rocked clockwise with shaft 72 and pin 71p will engage a rear arm of latch lever 68 thereby rocking the latch lever clockwise and raising its hook end to release bail 21. When a depressed digit key 1 is released, the lever 68 will be rocked counterclockwise by spring 67 and hook end 68a will rest atop of lug 21a as shown in FIG. 12.

Figures 12, 13:
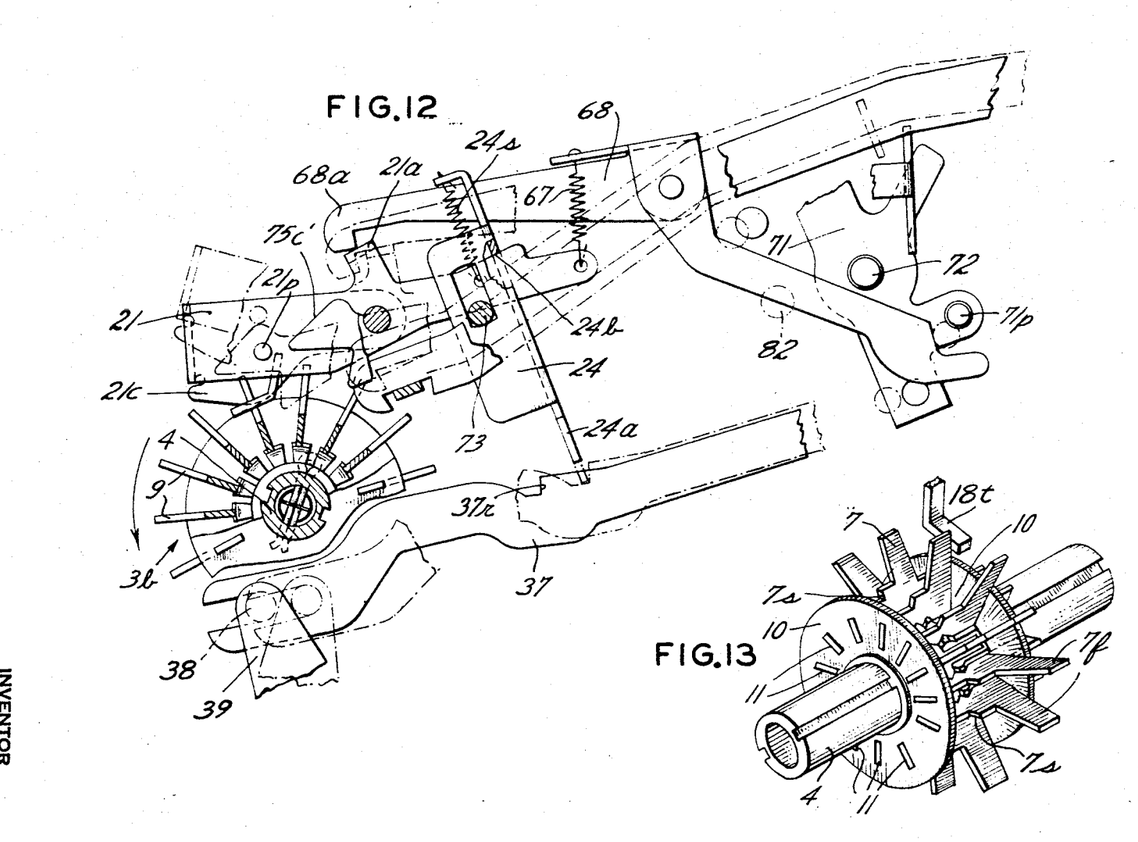
FIG. 12 is a side view of the storage drum and the ring of repeat operation slides and associated mechanism.
FIG. 13 is a perspective view showing structural details of a ring of control slides of the storage drum.

Bail 21 is adapted to control a repeat slide 24 (FIGS. 7c, 12). Slide 24 extends upwardly above the right arm of bail 21 rearwardly of the bail fulcrum and has a slot whereby it is mounted for vertical movement on a fixed pin 73. A spring 24s connects the top of slide 24 with the right arm of bail 21. Accordingly, when bail 21 is in counterclockwise lowered position, spring 24s holds slide 24 down with a shoulder 24b at its left edge engaging the upper edge of the right rear arm of bail 21. With the parts in the above position, the lower edge of a rightwardly extending lug 24a of slide 24 will be immediately above the upper edge of link 37 of clutch lever 23 and a slight distance rearwardly of a recess 37r in the upper edge of the link when said link is in forward position to disengage clutch 22.

When link 37 is moved rearwardly to engage clutch 22, recess 37r will be brought into alignment with lug 24a of slide 24. Now if bail 21 is raised thereby rocking the rear of its right arm downwardly, yieldable spring connection 24s will move slide 24 downwardly to engage recess 37 to hold link 37 for a repeat cycle of operation of clutch 22 as shown by the dot-dash lines of FIG. 12.

A single cycle of clutch 22 (FIGS. 2, 7a–7e) is effected for depression of each function key 2 in the program setting operation. Whereas in the automatic operation utilizing the program, later described, the single depression of master key 25 will result in a plurality of cycles of clutch 22 when one or more operations following an operation requiring digit entry through keys 1 do not require such digit entry. Means therefore is provided to prevent lug 24a of slide 24 (FIGS. 7c, 12) from engaging recess 37r of link 37 when control lever 30 is in the clockwise "learn" position of FIG. 3 as follows.

Lever 30 includes a depending arm having a pin 69 at its lower end to which one end of toggle spring 31 is attached. Pin 69 engages a cam slot 76s at the end of a rear arm of a lever 76 fulcrumed on a shaft 77. Lever 76 includes an upstanding arm 76a. When control lever 30 is in clockwise "learn" position, pin 69 will hold lever 76 counterclockwise with the upper end of arm 76a immediately beneath lug 24a of slide 24. Therefore when bail 21 is raised, spring 24s cannot move slide 24 downwardly to engage lug 24a with recess 37r of link 37 of clutch lever 23.

Lever 76 includes means to latch master key 25 (FIGS. 7c, 8) against depression when control lever 30 is in "learn" position. This means comprises a hook end 76h at the end of a forwardly extending arm of lever 76. When lever 30 is in "learn" position with lever 76 counterclockwise, hook end 76h engages an opening 39a in bail 39. Bail 39 is fulcrumed on transverse shaft 59. Bail 39 is connected through a bail 80 to a bail 81 on shaft 59. Bails 39, 80, and 81 therefore rock on shaft 59 as a unit. Bail 81 includes a pair of rearwardly extending arms to which the pair of stems 25s of elongated master key 25 are attached and which is normally held spring retracted. The hook end 76h of lever 76 engaging opening 39a will prevent clockwise movement of bails 39, 80 and 81, and therefore depression of key 25.

As previously noted, cam lobe 21c (FIGS. 5, 12) is immediately to the left of finger 9f of slide 9 when said slide is in right disabled position with respect to drum 3b and when said drum is in normal left position. This relationship between finger 9f and cam lobe 21c will not change when drums 3a–3b are right shifted because a tooth 18t prevents such movement of slide 9, as previously described, and the slide will be in enabled position with respect to drum 3b. Accordingly, when drums 3a–3b are restored to the left, enabled slide 9 will be prevented from such movement by engagement of finger 9f with cam lobe 21c, and therefore slide 9 will be restored to right disabled position with respect to drum 3b.

The setting operation for the first row of slides 7, 8, and 9 is completed when drums 3a–3b are restored to left normal position as described above. Following this restore operation, feeler levers 19 will be restored and drums 3a–3b will be indexed one step counterclockwise to bring the second row of slides 7, 8, 9 into setting position. These operations will occur substantially at the same time.

Levers 19 (FIG. 4, 8) will be restored clockwise about pins 2p by the connecting transmission train when cam 53 (FIG. 7a) permits return counterclockwise movement of follower 63 by spring 70. This will raise lever ends 19a to normal position. However, end 19a of lever 19 which is held rocked by depressed function key 2 will be raised from normal position to the raised position of FIG. 6b. After the function key is released, the related lever 19 will be restored counterclockwise thereby lowering its end 19a to normal (FIG. 6d).

The means for indexing drums 3a–3b includes the aforedescribed ratchet wheel 15 (FIGS. 2, 3, 7e, 11) which is splined on shaft 4 and in which said shaft is longitudinally shiftable.

Drums 3a–3b are located in clockwise home position by a pin 33 in ratchet wheel 15 engaging a stop shoulder 32s at the upper end of a stop pawl 32. Pawl 32 is held counterclockwise in engagement with pin 33 by a spring 34 which connects it to an escapement pawl 35 which is held clockwise by the spring. With the parts in the above position, an arcuate lower edge 35a of pawl 35 is immediately adjacent and in the counter-clockwise path of a lug 32a at the lower end of pawl 32. Edge 35a is adapted for engagement by lug 32a and clockwise from edge 35a is an arcuate recess 35r also adapted for engagement by the lug.

Figure 3:
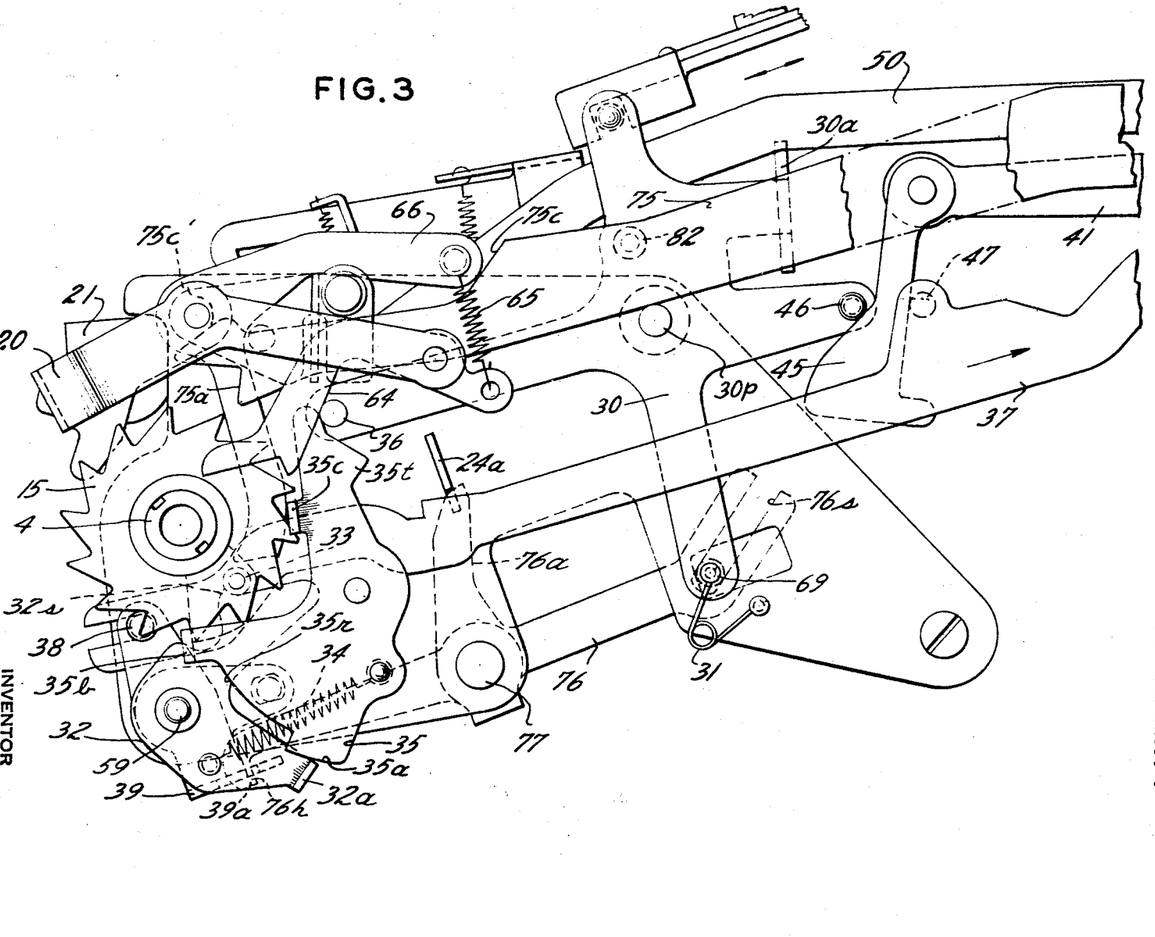
FIG. 3 is an enlarged view of parts shown in FIG. 2.

Escapement pawl 35 is arrested in clockwise position by a pin 36 at the end of a forwardly extending arm of control lever 30 which is engaged by an upstanding arm of the pawl, above a cam tooth 35t, when said control lever is in clockwise "learn" position (FIG. 3). With pawl 35 in the above clockwise position, an escapement lug 35b at the end of a forwardly extending arm of the pawl engages a tooth of ratchet wheel 15, and a lug 35c on the upstanding arm is out of the path of the operating end of a depending arm of release lever 64.

Lever 64, as previously noted, is at the rear end of the right arm of bail 20 and is biased counterclockwise by spring 65. Pin 36 of control lever 30 holds lever 64 clockwise with its operating end forwardly of lug 35c. Therefore, when bail 20 is rocked clockwise, as later described, the operating end of lever 64 will pass idly to the front of lug 35c of escapement pawl 35.

Previously noted, rebound crank 66 is biased clockwise by spring 65 against a suitable limit stop. With crank 66 in normal clockwise position (FIG. 3), the end of a depending arm thereof is in the counterclockwise path of pin 33 of ratchet wheel 15 when said wheel is in clockwise home position. The operation of rebound lever 66 will be described later.

Means operable to index ratchet wheel 15 and connected drums 3a–3b one position counterclockwise comprises a ram 75 having a front end in the form of a feed pawl 75a adjacent the top of the ratchet wheel. The rear end of ram 75 has a pin 75p which engages a slot 48s which is eccentrically located in cam 48. Ram 75 is supported adjacent its front end by a pin 30p which serves as a fulcrum for control lever 30 and is urged toward the rear by a spring 83 with pin 75p engaging the counterclockwise end of slot 48s.

Figure 10:
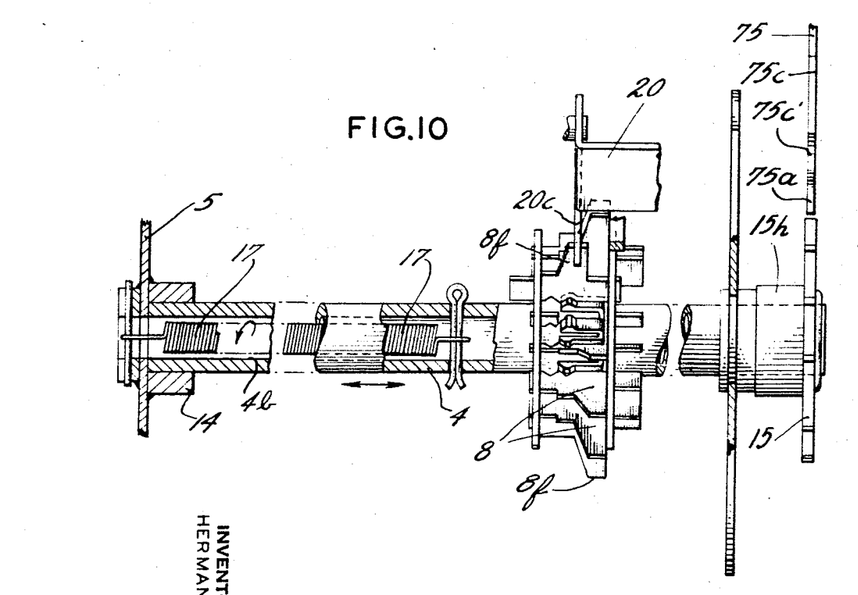
FIG. 10 is a front view partly in section and broken away of the storage drum and the ring of program terminating slides.

At substantially the same time that feeler ends 19a are restored upwardly, ram 75 will be moved forwardly to and then disabled in the next, and that only the slide 8 lift link 50 when lever 30 is adjusted counterclockwise engage pawl end 75a with a tooth of ratchet wheel 15 to index the wheel and drums 3a–3b one position counterclockwise to bring the second row of slides 7, 8, and 9 to setting position. In this operation, wheel 15 will be moved one tooth space past lug 35b of holding and escapement pawl 35. Furthermore when ram 75 is moved forwardly, a cam edge 75c thereof will engage a pin at the rear of the rear arm of rebound lever 66 and rock said lever counterclockwise to move its lower end from the path of pin 33 to permit indexing of wheel 15. Also, when ram 75 is moved forwardly, another cam edge 75c' at its front end will engage a pin 21p in the right arm of bail 21 thereby raising the bail which will then be held by hook end 68a of latch lever 68 engaging lug 21a as shown by the dot-dash lines (FIG. 12). When ram 75 is retracted, rebound lever 66 will be restored and lug 35b of pawl 35 will engage the radial edge of the passed tooth to hold the parts against the clockwise urge of return spring 17 (FIG. 10).

Figure 11:
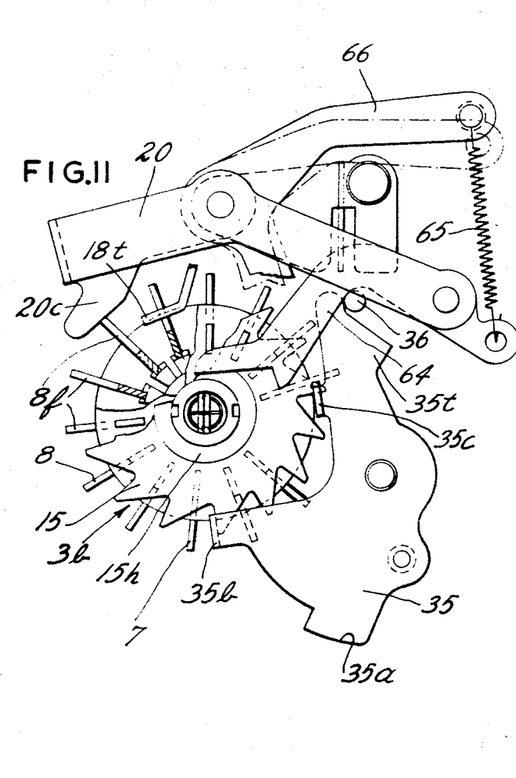
FIG. 11 is a side view of the storage drum and the ring of program terminating slides and associated mechanism.

It will be recalled that program terminating slide 8 of the first row was set to left enabled position (FIG. 10) and that finger 8f of this enabled slide was immediately to the rear of depending lobe 20c of bail 20. Therefore, when drums 3a–3b are indexed to bring the second row of slides 7, 8, 9 to setting position, finger 8f of this enabled slide 8 of the first row will engage the under edge of cam lobe 20c to raise and hold bail 20 as shown in FIG. 11. Furthermore, cycle control slide 9 (FIG. 12) was adjusted to left enabled position but was restored by cam lobe 21c. However, in the indexing operation, slide 9 will be moved forwardly of cam lobe 21c whereas finger 9f of slide 9 of the second row will be brought immediately to the right of cam lobe 21c which, however, will be raised above the end of the finger because of the operation of ram 75.

With the second row of slides 7, 8, 9 in setting position, the appropriate digit keys 1 will be depressed to enter the value for the second operation of the program. Depression of a numeral key will rock latch lever 68 to release raised bail 21 which will drop under the urge of spring 67 as previously described. This will bring cam lobe 21c immediately to the left of finger 9f of cycle control slide 9.

After depression of numeral keys 1, appropriate function key 2 will be depressed to initiate the second operation of the program and the attendant setting operation. Accordingly, a slide 7 and program terminating slide 8 will be set to enabled position in the second row of slides and cycle control slide 9 will first be set to enabled position and then restored to disabled position by cam lobe 21c of lowered bail 21 all as described in the setting operation for the first row of slides.

It will be recalled that program terminating slide 8 of the first row of slides 7, 8, 9 was set to left enabled position and its finger 8f engaged the under edge of came lobe 20c of bail 20 to hold the bail raised when the second row of slides was indexed to setting position. In the setting operation for the second row of slides, enabled slide 8 of the first row will be restored to disabled position as follows.

When drums 3a–3b are shifted to the right, finger 8f of slide 8 of the first row will be moved from engagement with the under edge of cam lobe 20c and bail 20 will drop to bring said lobe immediately to the left of finger 8f. Accordingly, when drums 3a–3b are restored to the left, cam lobe 20c will engage finger 8f and prevent leftward movement of slide 8 which will therefore be restored to right disabled position. Now when drums 3a–3b are indexed to bring the third row of slides 7, 8, 9 to setting position, finger 8f of enabled slide 8 of the second row will engage the under edge of cam lobe 20c to raise cam 20. From the above, it will be seen that slides 8 of the successive rows will be enabled in one setting operation which is enabled in the last setting operation of a program will remain enabled.

The appropriate function key 2 will be depressed to initiate the third setting operation of the program without entry of values through digit keys 1. The setting operation to enable a slide 7 and slide 8 of the third row, and to disable the previously enabled slide 8 of the second row will be performed substantially as described in connection with the second and first rows respectively. However, the setting operation for the third row will result in enablement of cycle control slide 9 because of no digit entry through digit keys 1 as follows:

It will be recalled that as an incident to an indexing operation for drums 3a–3b to bring a next row of slides 7, 8, 9 to setting position, bail 21 is raised and thereupon latched by latch lever as shown by the dot-dash lines of FIG. 12; and furthermore subsequent digit entry through keys 1 will release the bail. However, there is no digit entry for the third operation of the program, and therefore bail 21 will remain in raised latched position. Slide 9, as previously described, is adjusted to left enabled position by a comb tooth 18t when drums 3a–3b are shifted to the right. When the drums are restored to the left, cam lobe 21c of raised bail 21 will not be in the path of finger 9f of slide 9 which will therefore remain in enabled position with finger 9f immediately below the lower cam edge of cam lobe 21c. When drums 3a–3b are indexed at the end of the third setting operation, slide 9 will be moved to a position forwardly of cam lobe 21c so that bail 21 may be dropped for the fourth setting operation.

The fourth and last setting operation of the program calls for digit entry through keys 1 prior to depression of the appropriate function key 2. Therefore a slide 7 and slide 8 will be enabled in the fourth row whereas slide 9 will be disabled. Furthermore, slide 8 of the third row, which was enabled in the third setting operation, will be disabled.

At the conclusion of the fourth and final setting operations for the program, slides 7, 8 and 9 of the first four rows will be in the following adjusted positions. In the first row, one of the function control slides 7, will be enabled and all other slides will be disabled. In the second row one of the function control slides 7 will be enabled and all other slides will be disabled. In the third row, one of the function control slides 7 will be enabled, repeat slide 9 will be enabled, and all other slides will be disabled. And in the fourth row, a function control slide 7 will be enabled, program terminating slide 8 will be enabled, and all other slides will be disabled.

In the following section, a program of operations will be described as controlled by the memory devices with the storage drums 3a–3b of the devices set as described above.

OPERATION

After the program is set in drums 3a–3b as described above, control lever 30 will be adjusted manually from the clockwise "learn" position of FIG. 3 to the counterclockwise program operating position of FIGS. 2 and 7c to adjust various of the parts as follows:

Pin 69 of lever 30 will be moved counterclockwise in cam slot 76s and will rock lever 76 clockwise to raise hook end 76h from engagement with opening 39a of bail 39 thereby releasing master key 25. Furthermore, arm 76a of lever 76 will be moved clockwise from beneath lug 24a thereby freeing slide 24 (FIG. 12) for downward movement.

Pin 46 of lever 30 will be moved counterclockwise from the upward path of cam pendant 45 so that operation of lever 41 by the main clutch will not effect engagement of clutch 22.

A lug 30a of lever 30 underlies link 50 (FIG. 4) of the train which is operable to shift drums 3a–3b a step to the right upon operation of clutch 22. Lug 30a will thereby disengaging recess 50r from lug 51a of crank 51 so that drums 3a–3b will not be right shifted upon operation of clutch 22.

A pin 82 on the upper arm of lever 30 will engage the rear arm of latch lever 68 to rock the latch lever clockwise to raise its front hook end 68a from operating relationship with lug 21a of bail 21 so that the bail cannot be latched in raised position.

Pin 36 of the left arm of lever 30 will be moved counterclockwise to engage and pass beyond cam tooth 35t of escapement and back stop pawl 35. This will rock pawl 35 counterclockwise to disengage holding lug 35b from engagement with a tooth of ratchet wheel 15 to release the wheel. In this operation, stop pawl 32 will be rocked counterclockwise by spring 34 to engage its lug 32a with recess 35r so that pawl 35 will be held counterclockwise after pin 36 passes beyond tooth 35t. When wheel 15 is released, spring 17 (FIG. 10) will rotate drums 3a–3b and wheel 15 clockwise toward home position. Just before the parts arrive at home position, pin 33 of wheel 15 will engage the edge of stop pawl 32 above shoulder 32s to rock pawl 32 clockwise to remove lug 32a from engagement with recess 35r of pawl 35. Pawl 35 therefore will be rocked clockwise by spring 34 to reengage pin 36 while, at substantially the same time, wheel 15 and drums 3a–3b are arrested in home position by engagement of pin 33 with shoulder 32s of stop pawl 32. Furthermore, counterclockwise movement of pin 36 permits counterclockwise movement of release lever 64 by spring 65 to enabled position wherein its operating lower end engages lug 35c of pawl 35 as shown in FIG. 2.

With the parts adjusted as described above, the machine is conditioned for operation under control of the program control devices in accordance with the previously described settings of the first four rows of slides 7, 8, 9 of drums 3a–3b. It will be understood that any number of calculations comprising the set program of operations may be performed simply by entry of each required value in proper sequence through digit keys 1 followed by depression of master key 25. As previously noted, when an operation of the program does not require digit entry, it will be initiated automatically without depression of master key 25 after the preceding operation of the sequence. Furthermore, it will be noted that when the machine stops during a program of operations, the operator will know that the next digit entry is required followed by depression of master key 25. The machine will be operated as follows.

The first value of a calculation will be entered by depression of digit keys 1 and then master key 25 (FIGS. 1, 7e, 8) will be depressed. Depresion of key 25 will rock connected bails 81, 80, and 39 clockwise, and pin 38 of bail 39 will move link 37 rearwardly to engage clutch 22.

During the first part of the ensuing cycle of clutch 22, shaft 54 on which feeler levers 19 are pivotally mounted is moved downwardly to lower the levers as previously described. Only one of the function control slides 7 of the first row is in left enabled position wherein its finger 7f is immediately beneath feeler end 19a of the related lever 19 (FIGS. 6a, 6d). Feeler end 19a, therefore, cannot move downwardly and end 19a will be fulcrumed on the end of finger 7f. As a result, lever 19 will be rocked clockwise (FIGS. 4, 7a 8) about its front end 19a and its rear end will be moved downwardly to depress the connected function key 2 to initiate the machine operation.

All other slides 7 are in right disabled position wherein their fingers 7f are to the right of the respective ends 19a of related levers 19. These levers 19 therefore will be rocked counterclockwise about their rear connections with respective function keys 2 and ends 19a will be moved idly downwardly to the left of related finger 7f. These function keys 2 therefore will remain in retracted position.

Following the above operation to depress the first function key 2 of the program, feeler levers 19, except the one which depressed the key, will be restored, and as clutch 22 continues its cycle, drums 3a–3b will be indexed to bring the second row of slides 7, 8, 9 to control position. These operations are performed substantially as previously described in a setting operation. It will be recalled that slides 8, 9 of the first row are in disabled position, and therefore there will be no operation in contion with these slides.

Clutch 22 will be disengaged at the end of the cycle, and the main clutch will be disengaged and the depressed function key 2 will be released and retracted when the first operation of the program is completed. When key 2 is retracted, the connected lever 19 will be restored counterclockwise to normal.

The next required value for the second operation of the program will now be entered through digit keys 1 and master key 25 will be depressed. One slide 7 is enabled in the second row and slides 8 and 9 are disabled. Therefore, the operation will be substantially identical as described in connection with the first operation. However, a slide 7 of a different ring will be enabled for depression of a different function key 2.

It will be recalled that repeat slide 9, in addition to a function control slide 7, is enabled in the third row, and that there will be no value entry for the third operation of the program. Therefore, when the main clutch is disengaged upon completion of the second operation of the program, clutch 22 will be engaged automatically for the third operation of the program as follows.

When drums 3a–3b are indexed during the second cycle of clutch 22 to bring the third row of slides 7, 8, 9 to control position, finger 9f of enabled slide 9 will engage the under edge of cam lobe 21c of bail 21 thereby rocking and holding the bail clockwise to the dot-dash position of FIG. 12. Therefore, spring 24s between the rear arm of bail 21 and the top of slide 24 will move the slide downwardly to engage lug 24a with recess 37r of link 37 thereby holding link 37 rearwardly and clutch lever 23 in clutch engaging position after master key 25 is released.

Clutch 22 (FIGS. 2, 7a–7e) will complete its cycle before the initiated operation and therefore before the second depressed function key 2 is retracted. As a result, when clutch 22 completes its second cycle, it will be disengaged by single cycle clutch lever 26 (FIG. 7b) which is held clockwise while any function key is depressed. However, upon retraction of the depressed function key, clutch lever 26 will be restored and clutch 22 will be engaged automatically for the third cycle.

In the third cycle of clutch 22, a function key 2 will be depressed, as previously described, and drums 3a–3b will be indexed to bring the fourth row of slides 7, 8, 9 to control position. This indexing operation will remove finger 9f of enabled slide 9 of the third row from engagement with the edge cam lobe 21c. Accordingly, bail 21 will be restored counterclockwise to the full line position of FIG. 12 and slide 24 will be moved upwardly to remove lug 24a from recess 37r. Clutch lever 23 (FIG. 7c) will therefore be restored and clutch 22 will be disengaged at the end of the third cycle.

The fourth and final operation of the program requires digit entry through digit keys 1 followed by depression of master key 1 to engage clutch 22. Program terminating slide 8 in addition to a function control slide 7 is enabled in the fourth row. Finger 8f of enabled slide 8, however, is to the rear of cam lobe 20c of bail 20, and therefore has no immediate operating effect.

During the fourth cycle of clutch 22, a function key 2 will be depressed and then drums 3a–3b will be indexed as previously described. The indexing operation will move drums 3a–3b to its fifth position. However, enabled slide 8 of the fourth row will immediately operate means to restore drums 3a–3b clockwise to home position as follows.

As drums 3a–3b are indexed into the fifth position, finger 8f of enabled slide 8 of the fourth row will engage the under edge of cam lobe 20c and rock cam 20 clockwise from the position of FIG. 3 to the position of FIG. 11 to move release lever 64 downwardly. The lower end of lever 64 engages lug 35 of escapement pawl 35 as shown in FIG. 2, and therefore the pawl will be rocked counterclockwise to remove its holding lug 35b from engagement with ratchet wheel 15. Accordingly, as feed pawl 75a of ram 75 (FIGS. 3, 7e) is retracted, wheel 15 and drums 3a–3b will be rotated clockwise by spring 17 to home position. In this operation, finger 8f of slide 8 will be removed from engagement with cam lobe 20, and therefore bail 20 and release lever 64 will be restored. However, escapement pawl 35 will be held in release position by lug 32a of stop pawl 32 until the parts move to home position as previously described.

From the foregoing description, it will be seen that program slides 7, 8, 9 remain in their adjusted position until control lever 30 is moved to "learn" position and a new program is entered, and therefore a program can be repeated any number of times. If a new program uses a lesser number of rows of slides 7, 8, 9 than the prior program, the excessive rows will retain their old settings. It will be obvious, however, that drums 3a–3b will be restored at the conclusion of the last entered program and that the slides of the excess rows are without function in the program.

Movement of control lever 30 clockwise to "learn" position will cause drums 3a–3b to be restored clockwise to home position if a program is not completed leaving the drums in counterclockwise indexed position. Clockwise movement of lever 30 will rock pawl 35 thereby releasing ratchet wheel 15. Pawl 32 will hold pawl 35 rocked until pin 33 of wheel 15 rocks pawl 32 to release pawl 35 and engages shoulder 32s of pawl 32 thereby arresting arms 3a–3b in home position.

The invention is disclosed as embodied in a ten key type machine. It will be understood, however, that the invention is equally usable in a full keyboard type machine or in any calculating machine wherein a program includes a sequence of operations which are each normally initiated by independent means. The invention therefore is to be restricted only as necessitated by the scope and spirit of the appended claims.

What I claim is:

1. In a calculating machine having mechanism for performing a plurality of different operations, and
    means operable to initiate each of said operations:
    a mechanical storage memory device sequentially settable by movable members in response to a sequence of operations of said initiating means; and
    actuating means including said set memory device for repeating said sequence of operations of said initiating means.

2. In a calculating machine having mechanism for performing a plurality of different operations, and means for initiating each of said operations:
    a mechanical storage memory device including a plurality of means sequentially settable by movable members in response to sequential operation of a plurality of said initiating means; and
    actuating means including a set series of said settable means for repeating the sequential operation of the initiating means operable in the setting of said settable means.

3. In a calculating machine having mechanism for performing a plurality of different operations, and means for initiating each of said operations:
    a mechanical storage memory device including a series of storage means each settable by movable members to a plurality of positions respectively for said plurality of operations;
    setting means operable in response to sequential operation of a plurality of said initiating means to set a successive like number of said storage means to the positions respectively for the initiated operations; and
    actuating storage repeating means including said set succession of said storage means for repeating said sequential operation of said initiating means.

4. The invention according to claim 3; wherein each of said storage means includes a member for each of said operations, each of said members being settable to and from an enabled position; and
    said setting means is operable to set the member for the initiated operation to enabled position in each of said successive storage means.

5. The invention according to claim 4; wherein
    said memory device includes a common carrier for mounting said members of said storage means respectively in successive parallel rows;
    means is provided for locating said carrier in a home position wherein the first row of said members is in position for setting by said setting means; and
    means is provided for indexing said carrier subsequent to each operation of said setting means to bring the next row of said members into setting position.

6. The invention according to claim 5; wherein
    each of said rows when in setting position is in repeat operating position;
    said indexing means is operable subsequent to each operation of said repeating means; and
    said repeating means includes a single operation initiating member.

7. The invention according to claim 6; wherein
    said setting means includes an operating train associated with each of said members of a row in setting position;
    said train being operable with the associated enabled member in a repeat operation to initiate the operation performed in the setting of said member.

8. The invention according to claim 7; wherein
    said carrier is shiftable longitudinally of said rows to and from a normal position;
    said members of a row are slides; and
    said setting means includes means for adjusting said carrier a step of movement from and to said normal position means for blocking the slides of a row in setting position from movement with said carrier from normal position thereby effecting adjustment between said slides and said carrier, means for adjusting said operating trains to position to block movement of said slides respectively from movement with said carrier to normal position thereby restoring said slides, and means operable in conjunction with the operated initiated means to disable said means for adjusting the associated operating train to blocking position.

9. The invention according to claim 6; wherein
    each of said rows includes a program terminating member adjustable to and from an enabled position; and
    said setting means is operable to adjust the program terminating member of the row in setting position to enabled position, and is operable to adjust the program terminating member of the last previously set row to disabled position.

10. The invention according to claim 9; wherein
    means is provided for restoring said carrier to home position; and
    the enabled program terminating member is operable to effect operation of said restoring means when said carrier is indexed subsequent to a repeat operation to bring the next row of said members to repeat operating position.

11. The invention according to claim 6; wherein
    said machine includes means for entering a selected amount prior to initiation of each of given ones of said operations;
    each of said rows includes a repeat control member adjustable to and from an enabled position;

said setting means is operable to adjust the repeat control member of the row in setting position to enabled position; and means is provided for operation by said amount entering means to disable said setting means to adjust said repeat member to enabled position.

12. The invention according to claim 11; wherein
each enabled repeat control member is operable when its row is indexed to repeat operating position to operate the initiating means for the selected operation independently of said single operation initiating member.

13. The invention according to claim 6; wherein
said common carrier comprises a rotatable drum on which said rows of members are longitudinally mounted and circumferentially spaced; and said member for each of said operations comprises a slide.

14. The invention according to claim 13; wherein
spring means is provided to bias said drum rotatably to said home position;

said indexing means is operable to rotate said drum against the bias of said spring means; and means is provided to release said drum from said indexing means to permit operation of said spring means to restore said drum to said home position.

15. The invention according to claim 14; wherein
said means for initiating each of said operations includes a key;

said setting means is operable in response to depression of each of said keys to set the slide for the initiated operation to enabled position in the row which is in setting position; and said repeating means is successively operable in conjunction with successively enabled slides respectively to depress the keys successively to initiate the operations related to said enabled slides.

16. The invention according to claim 15; wherein
said setting means includes an operating train connected to each of said keys, each train being operable upon depression of the related key to control setting of the slide for the initiated operation to enabled position in the row which is in setting position; and each train operable to control setting of a slide to enabled position is operable in conjunction with said enabled slide in a repeat operation to depress the related key.

17. The invention according to claim 16; wherein
said drum is shiftable longitudinally to and from a normal position; and said setting means includes means for adjusting said drum a step of movement from and to said normal position; means for blocking the slides of a row in setting position from movement with said drum from normal position thereby effecting adjustment between said slides and said drum, means for adjusting said operating trains into position respectively to block movement of said slides of said row in setting position from movement with said drum to normal positions, and means operable by the key which is depressed in the setting operation to prevent adjustment of the associated train to blocking position.

18. The invention according to claim 16; wherein
each of said rows includes a program terminating slide adjustable to and from an enabled position;

said setting means is operable to adjust the program terminating slide of the row in setting position to enabled position and is operable to adjust the program terminating slide of the last previously set row to disabled position; and the enabled program terminating slide is operable to control said indexing means to release said drum for movement by said spring means to home position when said drum is indexed subsequent to a repeat operation to bring the next row of said slides to repeat operating position.

19. The invention according to claim 18; wherein
said machine includes means for entering a selected amount prior to initiation of each of given ones of said operations;

each of said rows includes a repeat control slide adjustable to and from an enabled position;

said setting means is operable to adjust the repeat control slide of the row in setting position to enabled position;

means is provided for operation by said amount entering means to disabled said setting means to adjust said repeat slide to enable position; and each enabled repeated control slide is operable when its row is indexed to repeat operation position to operate the initiating means for the selected operation independently of said single operation initiating member.

References Cited
UNITED STATES PATENTS

| | | | |
|---|---|---|---|
| 2,729,392 | 1/1956 | Butler | 235—60.47 |
| 3,181,784 | 5/1965 | Becker | 235—2 |
| 3,279,693 | 10/1966 | Eggebrecht et al. | 235—60 |
| 3,302,875 | 2/1967 | Kollmann et al. | 235—60 |
| 3,331,555 | 7/1967 | Englund et al. | 235—62 |
| 3,370,788 | 2/1968 | Gassino | 235—62 |
| 3,328,763 | 6/1967 | Rathbun et al. | 340—172.5 |

STEPHEN J. TOMSKY, Primary Examiner

U.S. Cl. X.R.

235—60